United States Patent
Wilson et al.

(10) Patent No.: US 10,842,083 B1
(45) Date of Patent: Nov. 24, 2020

(54) LIGHTS FOR INDOOR GROWING

(71) Applicant: Zea BioSciences Corp, Walpole, MA (US)

(72) Inventors: James G. Wilson, Medfield, MA (US); Gerald C. Antoine, Pembroke, MA (US); Robert A. Adams, North Easton, MA (US)

(73) Assignee: ZEA BIOSCIENCES CORP, Walpole, MA (US)

( * ) Notice: Subject to any disclaimer, the term of this patent is extended or adjusted under 35 U.S.C. 154(b) by 0 days.

(21) Appl. No.: 16/427,973

(22) Filed: May 31, 2019

Related U.S. Application Data

(60) Provisional application No. 62/678,536, filed on May 31, 2018.

(51) Int. Cl.

| | |
|---|---|
| F21K 9/00 | (2016.01) |
| A01G 7/04 | (2006.01) |
| F21K 9/27 | (2016.01) |
| F21V 29/70 | (2015.01) |
| F21Y 113/13 | (2016.01) |
| F21Y 103/10 | (2016.01) |
| F21Y 115/10 | (2016.01) |

(52) U.S. Cl.
CPC .............. *A01G 7/045* (2013.01); *F21K 9/27* (2016.08); *F21V 29/70* (2015.01); *F21Y 2103/10* (2016.08); *F21Y 2113/13* (2016.08); *F21Y 2115/10* (2016.08)

(58) Field of Classification Search
CPC .......... A01G 7/045; F21K 9/27; F21K 99/00; F21Y 2113/13; F21Y 2103/10; F21Y 2115/15
See application file for complete search history.

(56) References Cited

U.S. PATENT DOCUMENTS

| | | | |
|---|---|---|---|
| 2008/0158447 A1* | 7/2008 | Yan | G02F 1/133621 353/31 |
| 2014/0215914 A1* | 8/2014 | Takeuchi | A01G 7/045 47/58.1 LS |
| 2016/0295820 A1* | 10/2016 | Aykroyd | F21V 23/0471 |
| 2018/0066807 A1* | 3/2018 | Woo | F21S 4/28 |
| 2019/0297784 A1* | 10/2019 | Hegde | A01G 7/045 |

* cited by examiner

Primary Examiner — Y M. Quach Lee
(74) Attorney, Agent, or Firm — Arlene J. Powers

(57) ABSTRACT

An LED lighting system for use in an indoor growing system. The lighting system includes a lighting tray having a tube containing a printed circuit board therein. The circuit board has blue and red LED lights. The LEDs draw power and at least one of the LEDs draws power of less than 1 Watts and may draw less than ½ Watt. The dispersion angle of the LEDs is less than 40° degrees and may be less than 30° degrees. The heat-sinking capabilities of a standard circuit board are sufficient without special metalized layers or external heat sinks. Additionally, conversion to low voltage power is achieved remotely in an area away from the lights. In the lighting system, the ratio of red to blue LEDs is 15-24% red to 76-85% blue.

7 Claims, 1 Drawing Sheet

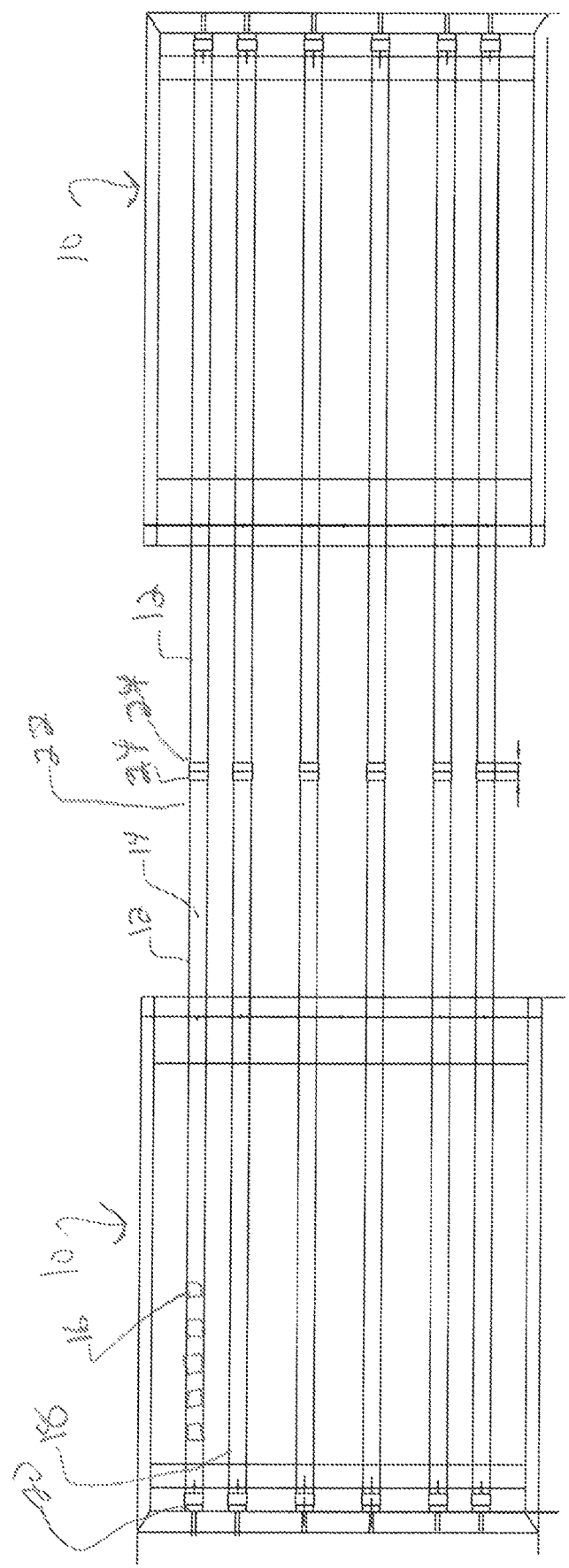

LIGHTS FOR INDOOR GROWING

CROSS REFERENCE TO RELATED APPLICATION

This application claims the benefit of U.S. provisional patent application entitled "LIGHTS FOR INDOOR GROWING" filed, May 31, 2018 and assigned to Ser. No. 62/678,536, which is incorporated by reference in its entirety.

BACKGROUND OF THE INVENTION

1. Field of the Invention

The invention is directed to indoor farming and more specifically to growing plants in an indoor environment such as a clean room wherein the growing environment of the plants is artificially controlled. More specifically, this invention is directed to lights which are more efficient, lighter weight, use less electricity and thus are less expensive than lights currently on the market to irradiate plants, the light irradiation being essential for plant growth.

2. Description of Prior Art

Indoor farmers have started to switch to LED lighting as a means for providing plants with the light that the plants need to grow. The lights currently in use are made of high-output LEDs with typical power usage of one Watt each or more. The LEDs are placed at a wide separation and are mounted onto substrates serving as heat sinks. Red and blue LEDs are combined in a ratio of several red LEDs to one blue LED.

Typically, a rack of plants will include a number of rows of plants wherein lights are situated above each row of plants. Due to the wide spacing between LEDs, the LEDs must be of a type that have a wide dispersion angle. With this setup, a significant amount of light escapes from the sides of the growing area and is lost. The lost light represents inefficiency, wasted energy and thus raises the cost of growing the plants.

The current devices generate such heat that expensive heat sinks, often having fins are required to draw heat away from the LEDs.

Additionally, due to the wide spacing between LEDs and particularly the wide spacing between the relatively few blue LEDs, current lighting systems do not provide even illumination to the leaves of the plants and do not ensure that each plant receives sufficient lighting. The uneven lighting results in growing cycles that are longer than necessary and uneven growing between the plants.

SUMMARY OF THE INVENTION

The present invention is directed to a lighting system used in indoor farming that incorporates a high number of low-wattage LEDs at relatively close spacing compared to existing LED systems. The low wattage LEDs do not require expensive heat-sinking or metalized heat-sinking substrates and are instead mounted directly on a standard, low-cost printed circuit board. Closer spacing between the LEDs results in more even distribution of light while maintaining a more desired ratio of red and blue LEDs to achieve improved growing in the plants.

An object of the invention is to provide a lighting system that incorporates a high number of low-wattage LEDs at relatively close spacing distributing light more evenly among the plants.

An object of the invention is to have a lighting system that does not require expensive heat-sinking substrates and instead utilizes a standard, low-cost printed circuit board to maintain the LED lights.

Another object of the invention is to incorporate low dispersion angle LEDs to avoid wasted energy flowing over the sides of the racks of plants thus improving efficiency and lowering cost.

Another object of the invention is to provide more even illumination of the plants by allowing every leaf to receive consistent illumination from both red and blue LEDs which are spaced more closely together.

Another object of the invention is to use only low voltage elements in the light producing tray to remove the requirement for ground-fault protection and avoiding any ground-fault induced tripping that might result in a missed light cycle or other problems.

Still another object of the invention is to reduce the cost of the lighting elements that are used to light and irradiate the plants.

BRIEF DESCRIPTION OF THE DRAWINGS

Other objects, features and advantages of the present invention will become more apparent as the description proceeds with reference to the accompanying drawing wherein:

FIG. 1 is a schematic illustrating a light fixture according to the invention.

DETAILED DESCRIPTION OF THE INVENTION

Example embodiments will be more fully understood from the illustration and detailed description hereinbelow.

The invention described below is directed to a lighting system which is utilized in indoor farms to illuminate and irradiate plants. As shown in FIG. 1, are two light trays 10 composed of long tubes 12 that contain long, narrow printed circuit boards 14. Upon these circuit boards are mounted sets of low-wattage LEDs 16 (not completely shown) along with the devices (not shown) that limit current to that which is appropriate for the LEDs. The tray is powered by a low-voltage power supply (not shown) that is remotely situated so that the local area requires no ground-fault protection. The first ends of the tubes 20 incorporate the connection to low voltage power whereas the second or opposing ends 22 of the tubes have caps 24.

In FIG. 1, the light tray is shown with six sets of light tubes, however, this will depend on the size of the rack of plants or tower that one is illuminating and irradiating. Also shown in the FIGURE are two sets of lights abutting one another, this is also dependent on the size racks, etc. one is utilizing. The tubes are manufactured from a clear polymeric material which is standard in the industry.

Previous LED lights used for indoor farming had an angle of dispersion of 120° or more. Since the LEDs utilized in the present invention are spaced more closely together they may be of the type having a narrow or low dispersion angle such as 30° and may be up to 40°. The smaller dispersion angle allows more of the light to be directed onto the leaves of the plants instead of flowing over the sides of the racks of plants thus resulting in less waste and more consistent plant growth The present invention is directed to a lighting system that incorporates a high number of low-wattage LEDs at relatively close spacing compared to existing LED systems. The low wattage LEDs do not require expensive heat-sinking, metalized heat-sinking substrates or specialized circuit boards with metalized heat dispersing layers and are instead mounted directly on a standard, low-cost printed circuit board.

In this embodiment, the red and blue LEDs are ¼ Watt chips and can thus be positioned very close together. A larger number of lower wattage LEDs may also be used. Many more of these chips can be utilized in the same amount of space as the 1 W LEDs previously used. It has been found that the set of LED lights having a range of 15-24% red to 76-85% blue LEDs is beneficial for the plants. The closer spacing between the LEDs results in more even distribution of light while maintaining a more desired ratio of red and blue LEDs.

It is preferred to use only low voltage elements in the light producing tray to remove the requirement for ground-fault protection and avoiding any ground-fault induced tripping that might result in a missed light cycle or other problems.

By incorporating all of the properties and elements above, the described lights are more efficient, lighter weight, use less electricity and thus are cheaper than lights currently on the market.

Although the present invention has been shown and described with respect to several preferred embodiments thereof, various changes, omissions and additions to the form and detail thereof, may be made therein, without departing from the spirit and scope of the invention.

What is claimed is:

1. An LED lighting system, said lighting system comprising a lighting tray having at least one tube, the at least one tube having a printed circuit board therein and the circuit board containing blue and red LED lights, wherein the lighting system is used for indoor plant growing and the LEDs have a dispersion angle up to 40°.

2. The LED lighting system of claim 1, wherein the LEDs draw power and at least one of the LEDs draws power of less than 1 Watts.

3. The LED lighting system of claim 1, wherein the LEDs draw less than ½ Watt.

4. The LED lighting system of claim 1, wherein the LEDs have a dispersion angle less than 30°.

5. The LED lighting system of claim 1, wherein the red and blue LED's are positioned directly on the circuit board without special metalized layers or external heat sinks.

6. An LED lighting system, said lighting system comprising a lighting tray having at least one tube, the at least one tube having a printed circuit board therein and the circuit board containing blue and red LED lights, wherein the lighting system is used for indoor plant growing wherein the ratio of red to blue LEDs is 15-24% red to 76-85% blue and the LEDs have a dispersion angle up to 40°.

7. The LED lighting system of claim 6, wherein the LEDs have a dispersion angle less than 30°.

* * * * *